United States Patent [19]
Yamagiwa

[11] Patent Number: 6,019,150
[45] Date of Patent: Feb. 1, 2000

[54] TIRE WITH TUBE CONTAINING SEALANT

[75] Inventor: Toshio Yamagiwa, Saitama, Japan

[73] Assignee: Honda Giken Kogyo Kabushiki Kaisha, Tokyo, Japan

[21] Appl. No.: 08/815,575

[22] Filed: Mar. 12, 1997

[30] Foreign Application Priority Data

Mar. 12, 1996 [JP] Japan ..................................... 8-054440

[51] Int. Cl.⁷ ....................................................... B60C 5/04
[52] U.S. Cl. ........................... 152/506; 152/427; 152/511; 152/DIG. 7
[58] Field of Search ..................................... 152/506, 511, 152/507, 427, 429, DIG. 7; 137/232, 231

[56] References Cited

U.S. PATENT DOCUMENTS

| | | |
|---|---|---|
| 1,427,277 | 8/1922 | Fetter . |
| 1,498,017 | 6/1924 | Crombie et al. ......................... 152/506 |
| 1,765,093 | 6/1930 | Ott .......................................... 152/506 |
| 1,831,967 | 11/1931 | McCall . |
| 1,836,902 | 12/1931 | Carnahan ................................ 152/506 |
| 1,874,197 | 8/1932 | Lang . |
| 2,038,473 | 4/1936 | Bronson .................................. 137/231 |
| 2,049,252 | 7/1936 | Eberhard ................................. 152/429 |
| 2,143,837 | 1/1939 | Becker ..................................... 152/429 |
| 2,230,879 | 2/1941 | Bronson ............................ 152/DIG. 7 |
| 2,275,820 | 3/1942 | Hosking ............................. 152/DIG. 7 |
| 2,326,998 | 8/1943 | Hosking .................................. 137/232 |
| 2,632,492 | 3/1953 | Placentino ............................... 152/506 |
| 2,657,729 | 11/1953 | Hardman et al. ....................... 152/506 |
| 2,664,936 | 1/1954 | Waber ...................................... 152/506 |
| 2,756,801 | 7/1956 | Iknayan et al. .......................... 152/506 |
| 3,637,002 | 1/1972 | Hughes .................................... 152/429 |
| 3,722,569 | 3/1973 | Hughes .................................... 152/429 |
| 4,768,574 | 9/1988 | Probst ..................................... 137/232 |

FOREIGN PATENT DOCUMENTS

| | | |
|---|---|---|
| 366801 | 10/1906 | France . |
| 411936 | 6/1910 | France . |
| 1045387 | 11/1953 | France . |
| 921189 | 5/1954 | Germany . |
| 58-74342A | 5/1983 | Japan . |
| 336103 | 6/1994 | Japan . |
| 06336103 | 12/1994 | Japan . |
| 694657 | 7/1953 | United Kingdom ................... 152/506 |

*Primary Examiner*—Geoffrey L. Knable
*Attorney, Agent, or Firm*—Birch, Stewart, Kolasch & Birch, LLP

[57] ABSTRACT

To provide a tire which allows the motor vehicle to continue operation even when both a tire body thereof and a tube mounted therein are damaged. A tire houses therein a tube which is compartmented into an inner circumferential air chamber filled with air and an outer circumferential sealant chamber filled with a sealant. The tire has lateral beads held and hermetically sealed against lateral steps of a rim. Even when the tube is pierced, the sealant repairs the pierced hole, preventing air from leaking out. Even if air leaks from the tube into the tire body, because the pierced hole in the tire body is repaired by the sealant and the beads, of the tire body are sealed against the rim, the air is prevented from leaking out of the tire body.

14 Claims, 3 Drawing Sheets

TIRE WITH TUBE CONTAINING SEALANT

BACKGROUND OF THE INVENTION

1. Field of the Invention

The present invention relates to a tire including a tire body and a tube with a sealant mounted within the tire body.

2. Description of Background Art

When a tube of a general tire is pierced with a nail or the like, air in the tube leaks from the pierced hole through a small gap between the tire body and the tube and then flows out through the nipple hole in the rim, resulting in a so-called puncture. It is known from Japanese laid-open patent publication No. 58-74342 to introduce a suitable amount of liquid sealant beforehand into a tube for automatically making a stopgap repair on a pierced hole when the tube is pierced.

According to another known tire structure disclosed in Japanese laid-open patent publication No. 6-336103, a tube is mounted in a so-called tubeless tire and a space for holding air is defined between the outer surface of the tube and the inner surface of the tire body. Even when the tire body is damaged and the air in the space leaks out, the tire body is kept in its original shape by air which is held in the tube.

SUMMARY AND OBJECTS OF THE INVENTION

The tube disclosed in the former publication, however, has a disadvantage in that when the tube suffers extensive damage and the sealant fails to be effective enough to repair the damage, air leaking from the tube into the tire body leaks out from the nipple hole in the rim, preventing the motor vehicle from continuing operation. The tire disclosed in the latter publication prevents the motor vehicle from continuing operation when the tire body and the tube are damaged by a long nail or the like.

The present invention has been made in view of the above drawbacks. It is an object of the present invention to provide a tire which allows the motor vehicle to continue operation even when both a tire body thereof and a tube mounted therein are damaged.

To achieve the above object, there is provided in accordance with the present invention a tire including a tire body and a tube mounted in the tire body and having a sealant, wherein the tire body has lateral beads disposed adjacent to an inner circumferential opening thereof, the beads being held and sealed against lateral steps of a rim, and the tube has an inner circumferential air chamber filled with air and an outer circumferential sealant chamber filled with a sealant.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
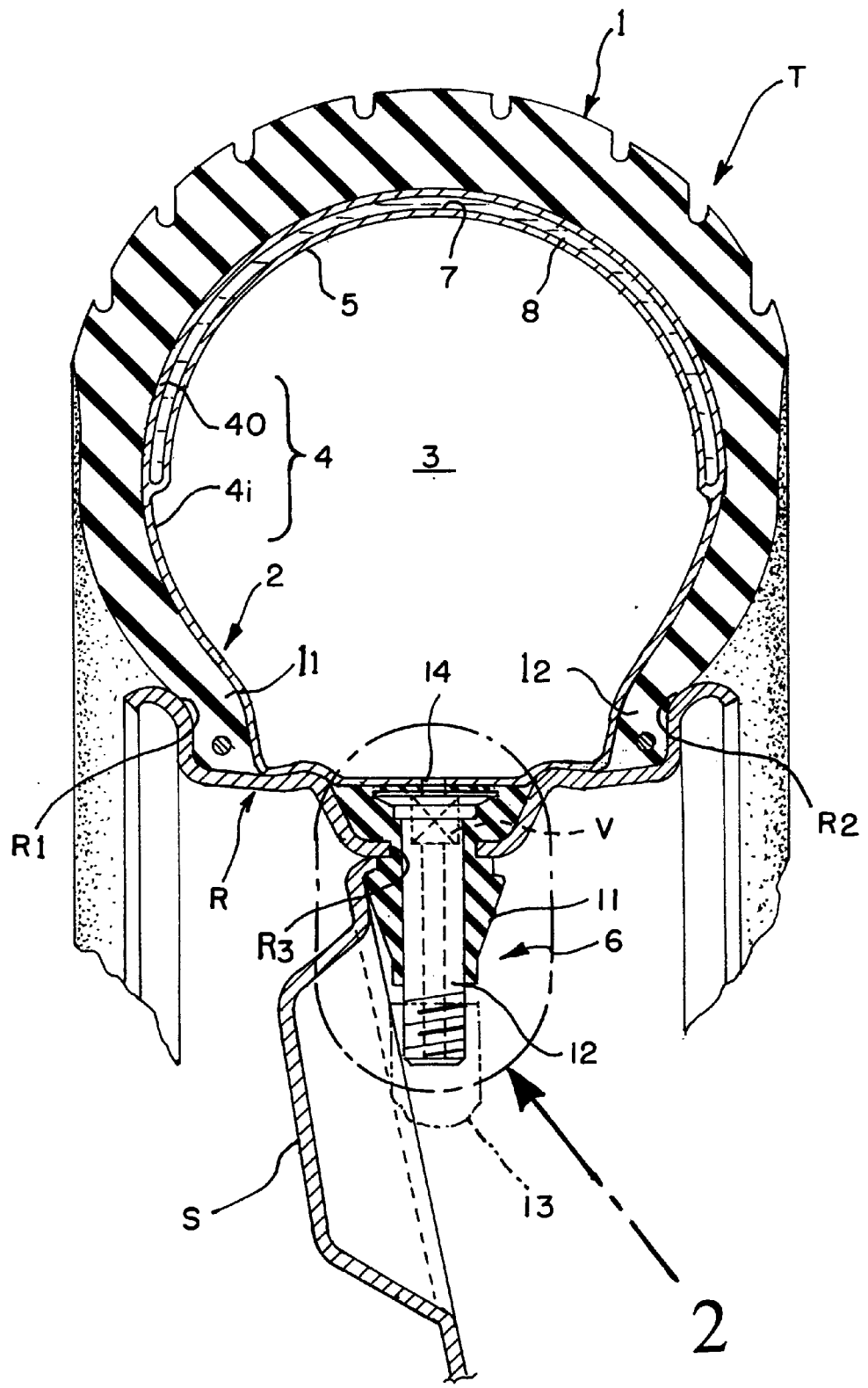
FIG. 1 is a transverse cross-sectional view of a wheel on which a tire with a tube according to a first embodiment of the present invention is mounted.

As shown in FIG. 1, a rim R of a motorcycle wheel is coupled to a hub (not shown) by spokes S. On the rim R, there is mounted a tire T comprising a tire body 1 and a tube 2 housed in the tire body 1 and having a sealant. When the tire T is installed on the rim R, lateral beads $1_1$, $1_2$ of the tire body 1 which are disposed adjacent to an inner circumferential opening thereof have respective outer surfaces held in intimate contact with lateral steps $R_1$, $R_2$ of the rim R, sealing the tire body 1 against leakage of air from the tire body 1. The tire body 1 and the rim R are sealed by the conventional sealing structure which is referred to as a tubeless tire.

The tube 2 has a circumferential wall 4 of annular cross-sectional shape which comprises an air chamber circumferential wall $4_i$ positioned radially inwardly and a sealant chamber circumferential wall $4_o$ positioned radially outwardly. The air chamber circumferential wall $4_i$ and the sealant chamber circumferential wall $4_o$ are joined to each other by a pair of junctions which are joined to each other by a partition 5 integral therewith.

The air chamber circumferential wall $4_i$ and the partition 5 jointly define therebetween an air chamber 3 of substantially circular cross-sectional shape which is filled with air. The sealant chamber circumferential wall $4_o$ and the partition 5 jointly define therebetween a sealant chamber 7, formed in a substantially arcuate cross-sectional shape, which is filled with a known liquid sealant 8. An air valve 6 for filling the air chamber 3 with air is mounted on the air chamber circumferential wall $4_i$.

Figure 2:
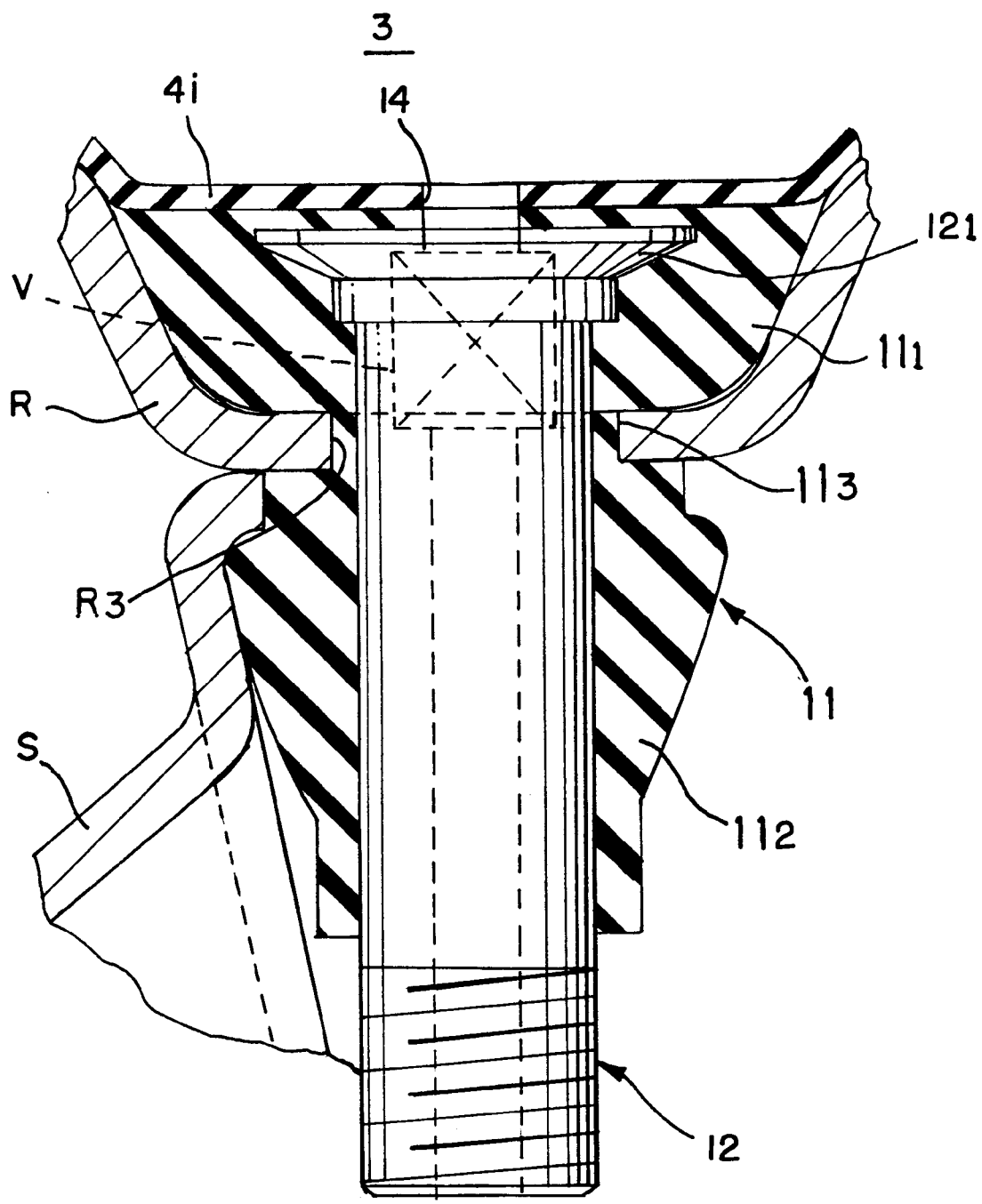
FIG. 2 is an enlarged cross-sectional view showing an encircled portion "2" in FIG. 1.

As can be seen from FIGS. 1 and 2, the air valve 6 is positioned in an inner circumferential region of the tube 2 and projects radially inwardly. The air valve 6 comprises a sealing member 11 of rubber, a pipe member 12 of metal embedded in the sealing member 11 and containing a check valve V, and a cap 13 of synthetic resin threaded over an end of the pipe member 12 which projects radially inwardly from the sealing member 11. The pipe member 12 has a radial outer end which communicates with the air chamber 3 through a hole 14 extending through the sealing member 11 and the tube 2.

The sealing member 11 comprises a base $11_1$ bonded to the tube 2, a tapered insert $11_2$ capable of being inserted through a hole $R_3$ defined in the rim R and a small-diameter sealing neck $11_3$ disposed between the base $11_1$ and the tapered insert $11_2$ and hermetically fitted in the hole $R_3$. When a flange $12_1$ on the radially outer end of the pipe member 12 is embedded in the base $11_1$ of the sealing member $11_1$ the pipe member 12 is prevented from being pulled out of the sealing member 11.

The operation of the tire according to the first embodiment, which has the above structure, will be described below.

The tire T is installed on the rim R as follows: First, the tube 2 from which air has been removed is put into the tire body 1, and the lateral beads $1_1$, $1_2$ of the tire body 1 are brought into engagement with inner surfaces of the steps $R_1$, $R_2$ of the rim R. At this time, the insert $11_2$ of the sealing member 11 of the air valve 6 is elastically deformed, and passed, together with the cap 13, radially inwardly through the hole $R_3$ in the rim R. The sealing neck $11_3$ of the sealing member 11 is now fitted into the hole $R_3$, hermetically sealing an outer circumferential edge of the hole $R_3$.

Then, the cap 13 is removed from the tip end of the pipe member 12, and air is supplied under high pressure into the air chamber 3 in the tube 2 through the pipe member 12, inflating the tube 2 in the tire body 1. Before the pressure in the tube 2 is applied to the beads $1_1$, $1_2$ of the tire body 1, since the beads $1_1$, $1_2$ are not sufficiently sealed against the steps $R_1$, $R_2$, air remaining between the outer surface of the tube 2 and the inner surface of the tire body 1 flows between the beads $1_1$, $1_2$ and the steps $R_1$, $R_2$ and is discharged out. Therefore, the tube 2 can be inflated without fail in the tire body 1. When the tube 2 is fully inflated, the pressure in the tube 2 laterally spreads the beads $1_1$, $1_2$ into intimate contact with the steps $R_1$, $R_2$, developing a sufficient sealing capability.

Because the sealant chamber 7 of the tube 2 is held in a shape complementary to the inner surface of the tire body 1, the sealant 8 filled in the sealant chamber 7 is prevented from being localized radially outwardly under centrifugal forces produced upon rotation of the wheel and imposed on the sealant 8. Therefore, even when the tube 2 is pierced radially or laterally by a nail or the like, the sealant 8 immediately fills and repairs the pierced hole, delaying any leakage of air from the air chamber 3.

Inasmuch as the sealant 8 held in the sealant chamber 7 does not flow into the air chamber 3, it does not clog the air valve 6 or a pressure gage or the like which may be applied to the air valve 6.

As described above, even when the tube 2 is damaged, the sealant 8 filled in the sealant chamber 7 repairs the damage to prevent air from flowing out of the tube 2. Even when the tube 2 is extensively damaged, allowing air to leak from the air chamber 3 into a region between the tube 2 and the tire body 1, the leaking air does not leak out of the tire body 1. Accordingly, the motor vehicle can operate continuously.

Since the pierced hole is repaired by the sealant 8 which leaks from the sealant chamber 7, air is prevented from leaking out of the tire body 1 through the pierced hole. Furthermore, the beads $1_1$, $1_2$ are sealed against the steps $R_1$, $R_2$, and the air valve 6 is also sealed with respect to the hole $R_3$ by the sealing member 11.

Even when the tire T is pierced by a nail or the like, air is prevented from leaking from the tire body 1 by the repairing capability of the sealant 8 and the sealing capability of the tire body 1 which is hermetically sealed against the rim R.

Figure 3:
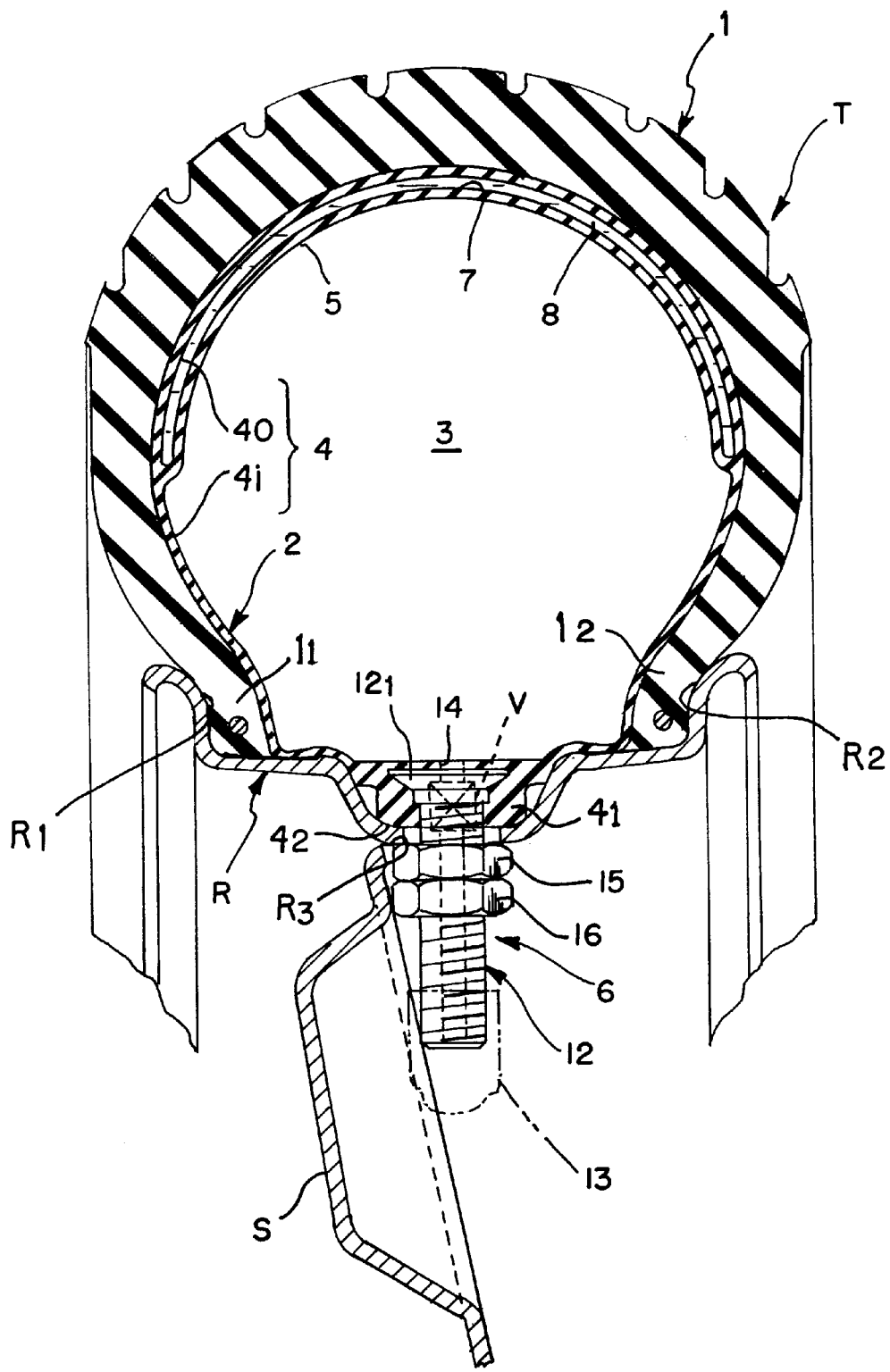
FIG. 3 is a transverse cross-sectional view of a wheel on which a tire with a tube according to a second embodiment of the present invention is mounted.

A tire according to a second embodiment of the present invention will be described below with reference to FIG. 3. Those parts of the tire according to the second embodiment which are identical to those of the tire according to the first embodiment are denoted by identical reference characters.

The second embodiment resides in the structure of the air valve 6. The air chamber circumferential wall $4_i$ of the tube 2 on which the air valve 6 is mounted has a thick portion $4_1$, and the flange $12_1$ of the pipe member 12 is embedded in the thick portion $4_1$. The pipe 12 which is externally threaded is inserted into the hole $R_3$ in the rim R, and is fastened to the rim R by nuts 15, 16. A sealing surface $4_2$ of the thick portion $4_1$ is held in intimate contact with the rim R around the hole $R_3$, preventing air from leaking from the tire body 1.

Other details of the tire according to the second embodiment are identical to those of the tire according to the first embodiment. The tire according to the second embodiment operates in the same manner and offers the same advantages as the tire according to the first embodiment.

According to the present invention, as described above, since the tire includes the tube having the inner circumferential air chamber filled with air and the outer circumferential sealant chamber filled with the sealant, even when the tube is pierced, the pierced hole is repaired by the sealant filled in the sealant chamber for thereby preventing air from leaking out of the tube. Even if air leaks from the tube into the tire body, because the pierced hole is repaired by the sealant and the beads of the tire body are sealed against the rim, the air that has leaked into the tire body is prevented from leaking out of the tire body. Therefore, the motor vehicle equipped with the tire is allowed to operate continuously.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A tire and rim for a vehicle comprising:

a tire body including an opening formed therein;

a tube mounted in the tire body, said tube includes an inner circumferential air chamber filled with air and an outer circumferential sealant chamber filled with a sealant;

a rim for mounting said tire body and tube relative thereto;

lateral beads disposed adjacent to an inner circumferential portion of said opening of said tire, the lateral beads being held and sealed against lateral steps of the rim, said lateral beads preventing escape of air from said tire;

a sealing member integrally mounted to said tube;

an inlet pipe connected to said sealing member for supplying air to said tube;

said sealing member includes a base bonded to an outside surface of said tube, a tapered insert for positioning through an aperture in said rim, and a sealing neck located between said base and said tapered insert for hermetically fitting within said aperture in said rim, said sealing neck having a diameter smaller than a diameter of said base; and said inlet pipe is embedded in said sealing member and includes an aperture extending therethrough and a check valve therein, said inlet pipe further includes a tapered flange formed on a first end adjacent said tube and within said base, said inlet pipe extending from within said base through said sealing neck and said tapered insert to an outside of said sealing member.

2. The tire and rim for a vehicle according to claim 1, wherein said inner circumferential air chamber and said outer circumferential sealant chamber are joined to each other by a pair of junctions with a partition integrally disposed therebetween.

3. The tire and rim for a vehicle according to claim 1, wherein said tapered insert includes a first enlarged portion for engaging an outer surface of said aperture after being positioned therein for retaining said sealing member relative to said rim, said enlarged portion having a first diameter, said tapered insert further including a second portion having a diameter greater than the diameter of said enlarged portion.

4. The tire and rim for a vehicle according to claim 1, wherein said lateral steps of said rim form a mating surface engaging said lateral beads to permit sealing therebetween.

5. The tire and rim for a vehicle according to claim 1, wherein said sealant is retained in a shape complementary to an inner surface of said tire body.

6. The tire and rim for a vehicle according to claim 1, wherein said tapered flange is embedded in said base at a spaced location from said tube, said base and said tube each including a hole formed therethrough in communication with said aperture in said inlet pipe.

7. The tire and rim for a vehicle according to claim 1, wherein the diameter of said base continuously decreases from said tube to said sealing neck, said sealing neck having a diameter smaller than the diameter of said base and a diameter of said tapered insert.

8. A tire and rim for a vehicle comprising:

a tire body including a substantially circular chamber with an opening formed adjacent to one side;

a tube mounted in the chamber formed within said tire body, said tube includes an inner circumferential air chamber having a substantially circular cross-section and being filled with air and an outer circumferential sealant chamber being substantially arcuate in cross-section and being filled with a sealant;

a rim for mounting said tire body and tube relative thereto;

lateral beads disposed adjacent to an inner circumferential portion of said opening of said tire, the lateral beads forming enlarged areas for being pressed by internal air pressure within said tube and said tire to be held and sealed against lateral steps of the rim, said lateral beads preventing escape of air from said tire; and a sealing member integrally mounted to said tube;

an inlet pipe connected to said sealing member for supplying air to said tube;

said sealing member includes a base bonded to an outside surface of said tube, a tapered insert for positioning through an aperture in said rim and a sealing neck located between said base and said tapered insert for hermetically fitting within said aperture in said rim, said sealing neck having a diameter smaller than a diameter of said base; and said inlet pipe is embedded in said sealing member and includes an aperture extending therethrough and a check valve therein, said inlet pipe further includes a tapered flange formed on a first end adjacent said tube and within said base, said inlet pipe extending from within said base through said sealing neck and said tapered insert to an outside of said sealing member.

9. The tire and rim for a vehicle according to claim 8, wherein said inner circumferential air chamber and said outer circumferential sealant chamber are joined to each other by a pair of junctions with a partition integrally disposed therebetween, said enlarged portion having a first diameter, said tapered insert further including a second portion having a diameter greater than the diameter of said enlarged portion.

10. The tire and rim for a vehicle according to claim, wherein said tapered insert includes an enlarged portion for engaging an outer surface of said aperture after being positioned therein for retaining said sealing member relative to said rim.

11. The tire and rim for a vehicle according to claim 8, wherein said lateral steps of said rim form a mating surface engaging said lateral beads to permit sealing therebetween.

12. The tire and rim for a vehicle according to claim 8, wherein said sealant is retained in a shape complementary to an inner surface of said tire body.

13. The tire and rim for a vehicle according to claim 8, wherein said tapered flange is embedded in said base at a spaced location from said tube, said base and said tube each including a hole formed therethrough in communication with said aperture in said inlet pipe.

14. The tire and rim for a vehicle according to claim 8, wherein the diameter of said base continuously decreases from said tube to said sealing neck, said sealing neck having a diameter smaller than the diameter of said base and a diameter of said tapered insert.

* * * * *